US007778935B2

(12) United States Patent
Colella

(10) Patent No.: US 7,778,935 B2
(45) Date of Patent: Aug. 17, 2010

(54) SYSTEM FOR SECURE PAYMENT AND AUTHENTICATION

(76) Inventor: Brian A. Colella, 4701 Girton Ave., Shady Side, MD (US) 20764

( * ) Notice: Subject to any disclaimer, the term of this patent is extended or adjusted under 35 U.S.C. 154(b) by 77 days.

(21) Appl. No.: 11/715,543

(22) Filed: Mar. 8, 2007

(65) Prior Publication Data

US 2007/0214093 A1 Sep. 13, 2007

Related U.S. Application Data

(63) Continuation-in-part of application No. 11/646,121, filed on Dec. 27, 2006.

(60) Provisional application No. 60/781,388, filed on Mar. 9, 2006.

(51) Int. Cl.
*G06Q 20/00* (2006.01)
*G06K 5/00* (2006.01)

(52) U.S. Cl. .......................................... 705/67; 235/380

(58) Field of Classification Search ................. 705/67
See application file for complete search history.

(56) References Cited

U.S. PATENT DOCUMENTS

| | | | | |
|---|---|---|---|---|
| 5,764,789 A | * | 6/1998 | Pare et al. | 382/115 |
| 5,955,961 A | * | 9/1999 | Wallerstein | 340/5.4 |
| 6,141,438 A | * | 10/2000 | Blanchester | 382/140 |
| 6,422,462 B1 | * | 7/2002 | Cohen | 235/381 |
| 7,328,844 B2 | * | 2/2008 | Workens | 235/451 |
| 2003/0055792 A1 | * | 3/2003 | Kinoshita et al. | 705/67 |
| 2004/0050930 A1 | * | 3/2004 | Rowe | 235/380 |
| 2007/0131759 A1 | * | 6/2007 | Cox et al. | 235/380 |

* cited by examiner

*Primary Examiner*—Calvin L Hewitt, II
*Assistant Examiner*—Zeshan Qayyum
(74) *Attorney, Agent, or Firm*—Ober / Kaler; Royal W. Craig

(57) ABSTRACT

A system and method for biometric-secure point-of-sale or online transactions and/or authentication and ID verification for restricted access that simplifies the checkout process and eliminates fraudulent transactions. The system employs a credit-card-sized device with integral fingerprint reader, on-board memory with pre-designated card number, infrared coder, power strip, plus at least one magnetic strip (encoded with designated financial account to be used for transactions, including routing number), one magnetic strip for personal medical and identification information and a bar code and photo ID for security. The card scanner is activated by an activation scan in which a subset of "minutia" are stored locally. To consummate a transaction (after registration), the user simply plugs their card scanner into a multi-function reader, and scans their own fingerprint. Upon authentication the card transmits the card/user ID to the reader as authentication of the transaction, the reader reads the encoded account numbers and routing information, offers a choice of account to charge to, verifies the total charge and completes the transaction. The process is fully secure.

5 Claims, 4 Drawing Sheets

SYSTEM FOR SECURE PAYMENT AND AUTHENTICATION

CROSS-REFERENCE TO RELATED APPLICATION(S)

The present application is a continuation-in-part of U.S. application Ser. No. 11/646,121 filed 27 Dec. 2006, and also derives priority from U.S. Provisional Application No. 60/781,388 filed Mar. 9, 2006.

BACKGROUND OF THE INVENTION

1. Field of the Invention

The present invention relates to secure point-of-sale purchasing and personal identification and authentication and, more particularly, to a system for biometric-secure point-of-sale transactions in retail settings to simplify checkout and eliminate fraudulent transactions, as well as for personal authentication restricted access locations and security checkpoints.

2. Description of the Background

Credit cards are convenient and widely used, but they are acutely susceptible to theft. Within minutes, thieves can purchase thousands of dollars worth of merchandise, and the unsuspecting consumer eventually pays one way or another. Indeed, the net Credit/Debit Card Fraud in the United States grew from about $637.32 M in 1990 to an estimated $1.35 B in 2002 according to the Nilson report and in 2005 over $55 billion according to the FTC. When a cardholder denies that he or she made a transaction, the amount is charged back to the merchant, who then does not get paid for the transaction. For example, in March 2000, Expedia.com reported a $4 to $6 million (US$) third quarter loss to cover fraudulent credit card purchases made on its Web site.

The numbers continue to grow and this continues to reflect poorly on the credit industry. Consumers hesitate to shop online and some still refuse to use a credit card due to their perception of utter insecurity. Consequently, many credit companies are investing in technologies to help make credit purchases more secure. Some credit cards now display a photograph of the cardholder so criminals can't make face-to-face purchases with a stolen credit card. Many cards have holograms, secret imprints, or hidden images so thieves have a harder time making a new credit card with a stolen credit card number. Credit card companies are also pressuring merchants to be more wary, and retailers are trying new security measures. On the other hand, over-zealous security measures wind up costing sales too. Security usually increases the transaction time, and consumers do not like spending excessive time while more secure transactions re cleared. They also do not like registering their personal information in too many places due to identity theft. Consumers like a balance between security and convenience.

Biometric authentication is gaining popularity as a security measure, and especially fingerprints. For example, U.S. Pat. No. 6,950,810 to Lapsley et al. (Indivos Corporation) issued Sep. 27, 2005 shows a tokenless biometric electronic financial transactions method for authorization of an electronic payment between a payor and a payee using a third party provider. Users register with the third party and give a fingerprint, as well as their financial account information. The information is used during an online auction, and in each instance the bidder provides their fingerprint. Payee bid identification data and the payor fingerprint are electronically forwarded to the third party who successfully identifies the payor and payee. An electronic financial transaction is then formed between the payor and payee, comprising a transaction amount and a payor financial account identifier. This transaction is then electronically forwarded to a financial transaction processor for processing.

United States Patent Application 20040199469 by Barillova et al. published Oct. 7, 2004 shows a method and system for authentication of online commercial transactions between a customer and a merchant comprising the steps of registering a customer with a PIN and a biometric sample, and a customer financial account. A temporary transaction code is issued to each authenticated customer; and conducting a transaction with a merchant using said temporary transaction code.

U.S. Pat. No. 5,613,012 to Hoffman et al. (Smarttouch, LLC) issued Mar. 18, 1997, and related U.S. Pat. No. 6,269,348 to Pare, Jr. et al. (Veristar Corporation) issued Jul. 31, 2001 both show a tokenless identification system and method for authorization of transactions and transmissions. The system uses a comparison of a fingerprint gathered directly from an unknown user, with an authenticated biometrics sample of the same type obtained and stored previously.

U.S. Pat. No. 6,270,011 to Gottfried issued Aug. 7, 2001 shows a method for providing secure transactions with credit cards by adding a fingerprint scanner at the point-of-sale to obtain fingerprint data, so that a credit card company database can verify the fingerprint data against stored fingerprint information and verify the transaction accordingly. The method is integrated into the existing negotiation protocol between a point-of-sale system and a credit card company database, and uses a human fingerprint and a secure algorithm. The credit card company has the customer fingerprint for comparison on its existing database. In the case of an Internet purchase, an authorization adaptor is connected to the user PC, and once the user has made the purchase request, an encrypted communication is then commenced in which a token is sent by the credit card company to the user PC, requesting fingerprint data. The authorization adaptor provides the fingerprint scan, and sends the data to the user PC in encrypted form, for transfer to the credit card company by a secure communication, for authorization. The fingerprint scanner is based on use of a new sensor employing a technology that maps and matches fingerprints, using coincidence of the features (minutia) on as few as twelve similar points, to determine a match.

United States Patent Application 20050165700 by Karthik (Multimedia Glory) published Jul. 28, 2005 shows a security system for electronic commerce for verifying the authenticity of a user including: a server authentication program installed in a web-server at a website of a web-service provider; a client software component and fingerprint scanner installed at a workstation of the user. The scanner takes and converts a biometrics image into digital data, which is then compressed and encrypted, and transmitted to the web-server.

U.S. Pat. No. 6,944,773 to Abrahams issued Sep. 13, 2005 slows a method of on-line authentication in which a user presents one or more fingerprints for authentication during an on-line transaction, such as an Internet transaction. The host system indicates how many fingerprints will be requested for authentication, randomly selects which fingerprints will be requested, and sends a request for entry of the randomly selected fingerprints, and then compares the received fingerprint data to fingerprint data stored in a database.

U.S. Pat. No. 6,241,288 issued to Bergenek et al. in 2001 shows a fingerprint identification/verification algorithm that uses bitmaps of a stored fingerprint to correlate with a bit map of an input fingerprint, wherein an accurate reference point is located. This is followed by the selection of several twodimensional areas in the vicinity of the reference point of the input image of the fingerprint. These areas are then correlated with stored fingerprint recognition information to determine if the input fingerprint image and the stored fingerprint recognition information are sufficiently similar to identify/verify the input fingerprint.

U.S. Pat. No. 4,229,023 to Luz issued Oct. 21, 1980 shows an identity check card with a fingerprint cut away in spots to provide alternate transparent zones and partial fingerprint zones. The placement of the card over a fresh fingerprint show immediately if the latter complements the former, thus permitting a quick and reliable check to be effected.

U.S. Pat. No. 5,869,822 to Meadows et al. issued Feb. 9, 1999 shows an automated fingerprint identification system. When a person applies for a credit card they must register a finger of their choice with the card issuance company. At the company, the finger is scanned and a composite number is produced that consists of several fingerprint-identifying parameters. The composite number is encoded onto the card and is stored in a card database. When a person wants to use the card, the card is inserted into a card reader and the person's finger is scanned by a fingerprint scanner, which produces a composite number. The immediate and stored composite numbers are compared and, when similar, use of the card is allowed.

U.S. Pat. No. 6,785,408 to Setlak et al. (Authentic, Inc) issued Aug. 31, 2004 shows a method for matching partial fingerprints using ridge flow.

United States Patent Application 20040044621 by Huang et al. (VISA) published Mar. 4, 2004 shows a payment system for facilitating a payment transaction between a payer and a payee using a separate payer access device, payee access device, and a services hub. Use of the access devices generates a tracer ticket. Upon receiving the copy of the tracer ticket, the payer uses the payer device to communicate with the services hub and forward the received copy of the tracer ticket to the services hub. The services hub then validates the payer device based on the access device information. Upon validation of the payer device, the services hub checks the copy of the tracer ticket forwarded by the access device against the previously generated tracer ticket. If the copy of the tracer ticket forwarded by the access device corresponds to the previously generated tracer ticket, the services hub authorizes the payment transaction against the payer account.

AuthenTec Inc. has announced the TruePrint(™) fingerprint reader with incorporated Bluetooth transmitter. AuthenTec's press releases claim the company has 17 pending patents, but does not state the countries in which they are pending.

Internet Commerce Account Status Information (ICASI) sells a third party service that requires a biometric finger-scan to authorize use of a business bank account, credit card transaction, or online commerce. Once users have registered their fingerprints, they can conduct business with thousands of participating merchants. A window pops up asking users for authentication via the finger scanner. The scanner plugs into a USB port. The finger-scanner creates a "template" that is used to authenticate. A template can never be converted back to the original fingerprint. All fingerprint information is gathered using SSL encryption, then stored securely on computers not accessible from the outside. ICASI strives for privacy and will not sell or share information with any other company.

The TouchPass log-on security solution by NEC Technologies, Inc. offers finger-imaging technology to authenticate an individual's identity.

DigitalPersona, Inc. provides a complete fingerprint security system for PCs using USB fingerprint sensors. The plug-and-play USB fingerprint sensor is self-calibrating, and features auto and optimal image capture, latent image removal, a challenge-response link, and encrypted transmission of biometric information.

While the foregoing references all teach improved security through fingerprint biometrics, none pays attention to user-privacy refinements, or speed and convenience of each transaction.

SUMMARY OF THE INVENTION

Accordingly, it is an object of the present invention to provide a secure form of identification for individuals that can only be used and accessed by the individual owner of the card, while also assisting merchants and consumers in protecting themselves against the dramatic increase of transaction fraud via biometric security, while also ensuring complete privacy of consumer's biometric and financial data.

It is another object to provide a convenient method for biometric-secure overall point-of-sale setting, as well as restricted access authentication, to provide a individual high-confidence authentication and yet simplify the checkout and/or authentication process.

According to the present invention, the above-described and other objects are accomplished by providing a transaction system to facilitate the point-of-sale purchase process (and restricted access authentication process) with integrated encrypted biometric (fingerprint) security. More particularly, the system permits biometric-secure buying, selling, bill paying and authentication in retail point-of-sale settings and other secure-access settings to simplify checkout and to eliminate fraudulent transactions.

The transaction system is implemented by a sponsor that subscribes users as well as participating banks, financial and other supporting institutions. Thus, all users are required to pre-register and this may be accomplished at the participating banks, financial and other supporting institutions with user-accessible locations. The sponsor distributes fingerprint card scanners to these participating banks and other supporting institutions, and in order to register, each user simply pays a visit and obtains a fingerprint card scanner at the participating bank or supporting institution (which serves as a registration agent for the sponsor), and activates their fingerprint card scanner on site.

The card scanner generally comprises a credit-card-sized housing with integral biometric fingerprint reader, a variable amount of on-board memory with a pre-designated card number, an encrypted processor, an infrared coder, communications power strip, plus multiple magnetic strips (for use with multiple existing card readers), a bar code and a individuals photo for instant ID secure verification. There are no visible account numbers on the card.

At registration, each user provides their bibliographic information and designates the financial accounts to be used for transactions, including routing numbers. The bibliographic and financial information is recorded at the bank along with the card/user number of the assigned card scanner, and some of this same data is encrypted and encoded onto the dual magnetic strips. At activation, each user completes an initial fingerprint scan using their fingerprint card scanner. The activation scan is digitized and encrypted and a portion of the digital activation scan is memorized by the card scanner. The stored portion comprises a subset of "minutia", e.g. major characteristics of the fingerprint. Thus, the card scanner thus becomes the user's personal key for authenticating their transactions, each subsequent scan being compared to the stored scan for authentication.

To consummate a transaction (after registration and activation), the user simply plugs their card scanner into a multi-function card reader, and scans their own fingerprint. The fingerprint card scanner obtains scan data corresponding to the same section of the fingerprint taken at activation, compares it to the stored fingerprint portion and, upon authentication transmits the card/user ID to the reader as authentication of the transaction or access. Upon authentication, the reader reads the encrypted encoded account numbers and routing information from the cards on-board processor/scanner, offers a choice of account to charge to, verifies the total charge and completes the transaction. Given authentication, the user information and routing number for the transaction are transmitted to the designated bank or financial institution to clear the transaction. All such data transmission is fully encrypted. Thus, the user's own card scanner gives instant authentication, and since only the encrypted user/card number, transaction details and routing information is ever transmitted (not fingerprint data) this system more fully protects the user's privacy.

The sponsor collects a small user fee each time the card is used for a transaction at any point-of-sale location. This fee is charged in real-time to the user and paid to the sponsor by users participating financial institution. This fee is charged to the user for each transaction, (for example, for a $100 card transaction, the flat fee is $0.05, added for a total charge of $100.05). The sponsor collects a online transaction fee in real time directly from the bank or financial institution called upon to complete payment from a user account. Thus, the user-cost of the transaction includes the transaction amount, plus a minimal flat transaction fee reserved for the sponsor. This is displayed to the user (for example, for a $100 transaction "do you agree to pay a sponsor transaction fee of $0.50?" is displayed to user). If the user accepts, the designated financial institution hosting the selected user account consummates the transaction, debiting the user account by the transaction amount, plus the minimal flat transaction fee reserved for the sponsor. The sponsor collects their transaction fee right in real time when a transaction is done, the proceeds being transferred into a sponsors account. The net result is an entirely secure transaction, and revenue to the sponsor is allocated in real time.

The self-authenticating SAFE Card combines memory & magnetic strips on a smartcard platform with built-in biometric fingerprint recognition, to provide exceptionally robust user authentication while performing a variety of smartcard functions. These functions can include but are not limited to; account management, airline or any form of secure associated travel, accessing facilities or networks, secured borders, hospitals, drug related services, personal medical information, authorizing electronic transactions or transmitting a certified digital signature while assuring privacy of all data associated with the card. The user's unique fingerprint offers a reliable and economical means of biometrically authenticating the user's identity far more securely than using a personal identification number (PIN) or a password. By linking the user directly to the transaction process through their fingerprint, the cardholder's identity is confirmed beyond repudiation; they are not just someone who picked-up a stray card or happens to know the card's assigned PIN or password. The all-in-one, credit card-sized device contains its own integral fingerprint reader, on-board memory, a serial number and bar-code, multiple magnetic strips, and a photo for ID security. The card's biometric sensor is completely contained in a self-authenticating subsystem. It does not require the use of any external sensors, algorithms, template matches or database access. This card employs a third generation capacitive array sensor chip that detects and captures small variations in the finger surface capacitance and creates a three-dimensional electrical image of the fingerprint's unique pattern. The card is activated by a subset of "minutia" that is stored locally on the device itself. The unique features of the image are extracted to form its own encrypted template which is then stored into protected memory in the module. This entire operation is completed on the card. Upon completion of the enrollment process, the module is "locked" and subsequent placement of any finger on the sensor triggers the verification process. This involves comparing the previously stored "registered" data with the current finger. With the card's authentication and a resulting match, the person holding the card is verified as its original enrolled authorized user. To consummate a transaction (after registration), the user simply plugs their card into a multi-function reader and scans their own fingerprint. Upon authentication, the card transmits the card/user ID to the reader for authentication for access or a secure transaction. The foregoing processes are fully secure and these cards can only be accessed by the original enrolled user on the device (the SAFE Card does not rely on a bio-metric registrar or database for their use).

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 4 illustrates the method for using the Safe Card scanner 2 for secure airline and airport check-in.

DETAILED DESCRIPTION OF THE PREFERRED EMBODIMENTS

The present invention is a system, inclusive of method, card scanner and card reader for facilitating the point-of-sale purchase process, as well as restricted access authentication process, with integrated biometric (fingerprint) security. More particularly, the system permits biometric-secure buying, selling, bill paying and authentication in any point-of-sale settings or other secure-access settings to simplify checkout and to eliminate fraudulent transactions.

Figure 1:
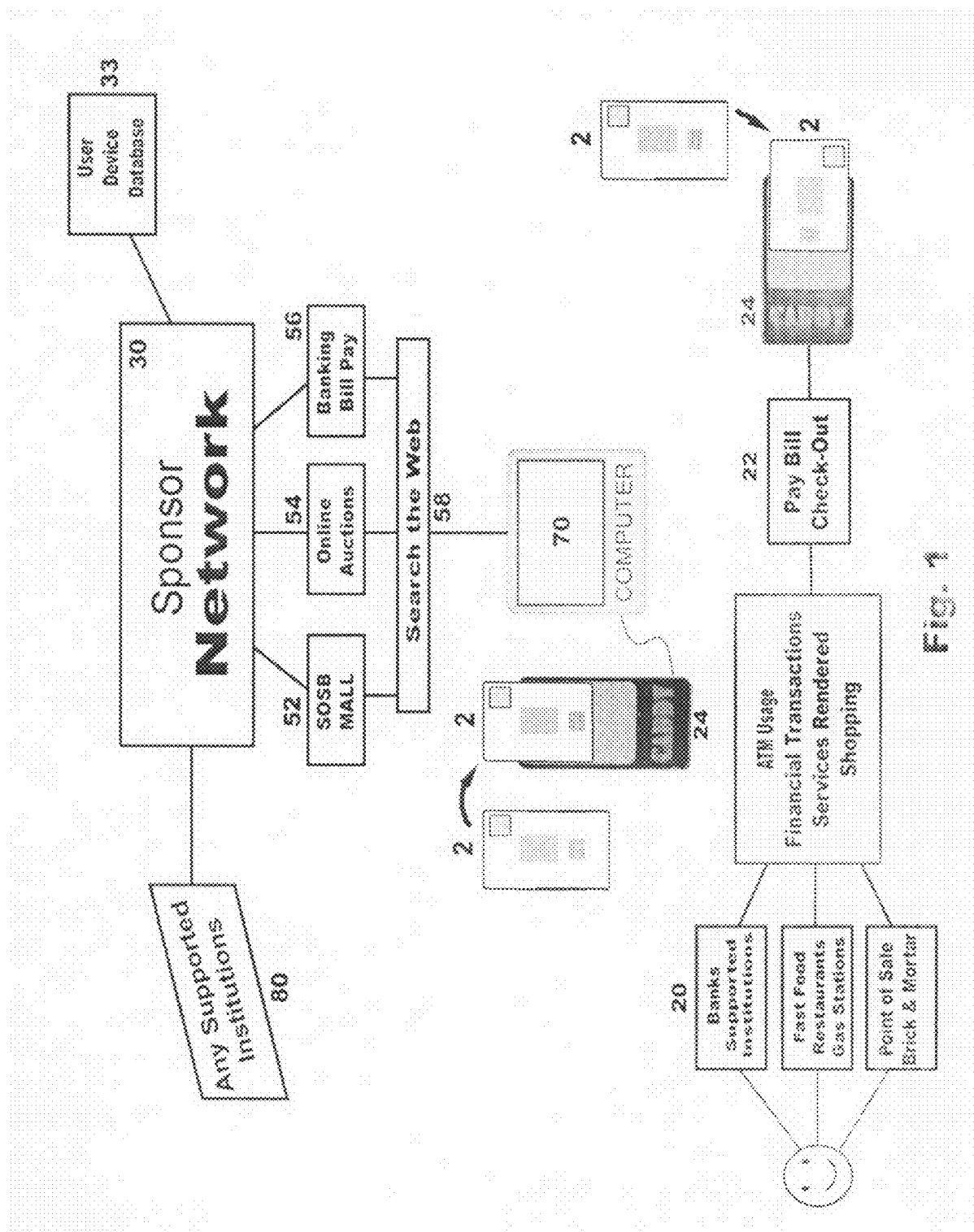
FIG. 1 is a block diagram illustrating a preferred embodiment of the present system for biometric-secure transactions either online or at point-of-sale locations.

FIG. 1 is a block diagram illustrating a preferred embodiment of the present system for biometric-secure transactions either online or at point-of-sale locations. The system is sponsored by a 3rd party sponsoring application service provider 30. The sponsor 30 maintains a service provider network and distributes the particular fingerprint card scanners ("Safe Cards") 2 according to the present invention to users through participating banks and other supporting institutions 80 (the latter essentially serving as a registration agent for the sponsor 30).

Given a registered and activated Safe Card scanner 2, as shown in the bottom section of FIG. 1, users may complete a transaction at any point-of-sale checkout 22 at any fixed location 20 including but not limited to; retail stores, banks and ATMS, fast food restaurants and gas stations, or any other brick and mortar locations. In addition, the Safe Card scanner 2 may be used to gain authorized access to secure locations.

Alternately, given a registered and activated Safe Card scanner 2, as shown in the top section of FIG. 1, users may complete any online transaction via their own computer 70. In addition, the Safe Card scanner 2 may be used to gain authorized access to any computer 70.

Prior to actually consummating a transaction online, users are required to preregister with the sponsor 30 as do retailers and merchants 20. The users may accomplish this at any participating bank or supporting institution 80 having user-accessible locations. The sponsor 30 distributes biometric Safe Card scanners 2 to the participating banks and other financial institutions 80 and in order to register each user simply pays a visit, obtains a Safe Card scanner 2, registers at the participating banks or other supporting institutions (which serve as a registration agent for the sponsor 30), and activates their Safe Card scanner 2. Activation entails scanning an individual's fingerprint. The fingerprint image is digitized and a portion of the digitized fingerprint scan is stored locally on the Safe Card scanner 2 along with an assigned card/user number of the Safe Card scanner 2 for later comparison. The stored portion of the digitized fingerprint scan comprises a subset of the minutia of the scan. The user may also provide one or more credit/debit accounts and routing information to the bank, and this information is also encoded onto the Safe Card scanner 2. This way, once a transaction is approved the details can be directed to the appropriate bank 20 to effect payment.

The activating bank 20 will also register a bar code encoded with the assigned card/user number, and will attach a photo ID of the user to the Safe Card scanner 2 for security.

With activation complete, the user is now ready to complete transactions, including any and all credit and debit purchases of goods, services, as well as authentication of returns of goods, charge backs, etc., and they can use their Safe Card scanner 2 for virtually any secure check-in location, as well as personal access to lock-boxes, laptop computers, desktops, etc.

After registration and activation, the user can consummate any transaction simply by going to a point-of-sale checkout station 22 and inserting their Safe Card scanner 2 into any supporting point-of-sale card reader 24 such as ATM machines, Point-of-Sale terminals, etc. The transaction can be authorized in a secure manner in seconds.

As seen at the top of FIG. 1 the Sponsor Network 30 additionally provides users with an array of web portals for online shopping, online bill payment, and general internet searching, including a virtual shopping mall 52, online auctions 54, an online banking and bill payment function 56, and internet search engine 58, among others. All of these web portals 52-58 are preferably accessible to users from a central website maintained by the sponsor through their network 30. Thus, users having a computer 70 with a USB port, or any supporting card reader may access the sponsor network 30 directly or indirectly through search engine 58 and likewise complete online transactions.

Figure 2:
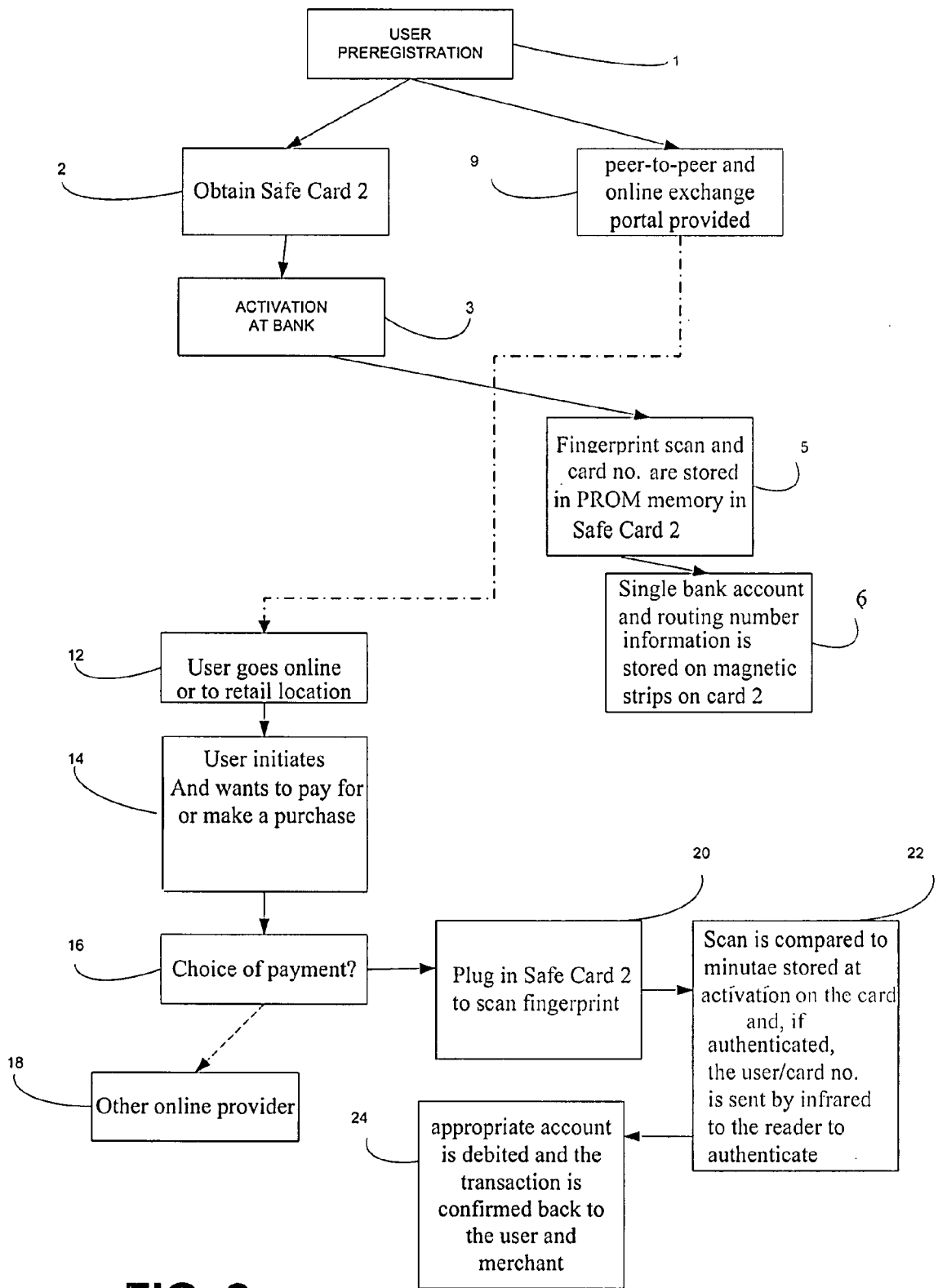
FIG. 2 is a block diagram illustrating a preferred embodiment of the method according to the present invention.

FIG. 2 is a top level flow diagram illustrating the method steps of the present invention, which will now be described in detail with regard to FIGS. 1 and 2.

At step 1 (FIG. 2) users must first register themselves with the sponsor 30 through participating and supported institutions 80. This is accomplished physically at any participating financial or supporting institution 80 which essentially serves as a registration agent for the sponsor service. At registration, each user obtains a Safe Card scanner 2 (at step 2), and provides their bibliographic information as well as if required designated financial accounts to be used for transactions, including routing numbers.

The Safe Card scanner 2 is useless until activated, and so at step 3 the user activates their Safe Card scanner 2. Activation entails completing an "activation scan" of the user's fingerprints. At the activation scan the fingerprints are scanned in three-dimensions and are digitized, and at step 5 a portion of the 3D digitized fingerprint scan is stored locally on the card scanner for later comparison, along with the user/card number. The stored portion of the digitized fingerprint activation scan comprises a subset of minutia derived from the scan. The minutia are derived from the ridges and furrows of the skin in 3D, and are typically located where ridge endings or bifurcations are found. There are various existing open source algorithms for accomplishing this. Approximately 30 points of minutia are preferred as this results in a small PROM memory requirement of a minimum of 64 kbytes. At step 6, the designated account information and routing numbers are encrypted and encoded onto the memory on the Safe Card scanner 2 for later use. Under this scheme, no party to the transaction possesses the fingerprint data, nor any portion of the fingerprint itself, and the user's privacy is maintained. The user is now ready to complete transactions.

Once registered and activated, the user is free to partake in online or point-of-sale transactions such as at online mall 52, retailers 54, online banking and bill payment facility 56, or as at step 12 may physically go to any other transaction site equipped with a supporting standalone card reader 24, including ATMS and point-of-sale terminals, or any peripheral card reader connected to a computer, or any computer equipped with a USB port.

As an example, at step 14 the user goes to WalMart and finds an item to purchase and goes to check-out. They are given a choice as to whether to pay with the Safe Card scanner 2, or any other available credit or debit provider company to which the user is subscribed. The user makes their choice at step 16. This choice may be displayed and made via the point-of-sale reader or computer.

If, at step 20, the user chooses the Safe Card scanner 2 they need only insert their Safe Card scanner 2 into the appropriate point-of-sale reader or computer. The user does so and places their finger on the card. This automatically initiates a scan of their fingerprint.

The Safe Card scanner 2 instantaneously captures a portion of the fingerprint minutia, and compares the minutia to those stored at activation. The Safe Card scanner 2 indicates a match or not, and if a match communicates the fact by sending the user/card number to the reader via a wireless (infrared) communication port. The point-of-sale terminal 24 of FIG. 1 (e.g. card reader) prompts the user as to which bank or financial account to debit. Given a confirmed match the reader authorizes the transaction, reads the appropriate routing information from the Safe Card scanner 2, and directs the transaction details to the appropriate bank or supporting institution 80, the appropriate account is debited and at step 24 the transaction is confirmed back to the user and merchant. Confirmation (or declination) is signaled to the user by a yes or no confirmation screen (or in the case of point-of-sale purchases a merchant screen conveyed on to the user for yes or no confirmation). If the transaction is confirmed a green light authentication is sent to authorize the transaction.

Preferably, the sponsoring network 30 charges the user a flat per-transaction fee which is paid in real time directly from the supporting institution upon consummation of the transaction. This low third party fee is justified due to the elimination of fraud expense. The net result is substantially secure transaction.

One skilled in the art will understand that the present method may be incorporated in any distributed architecture, over any type of communication backbone.

Figure 3:
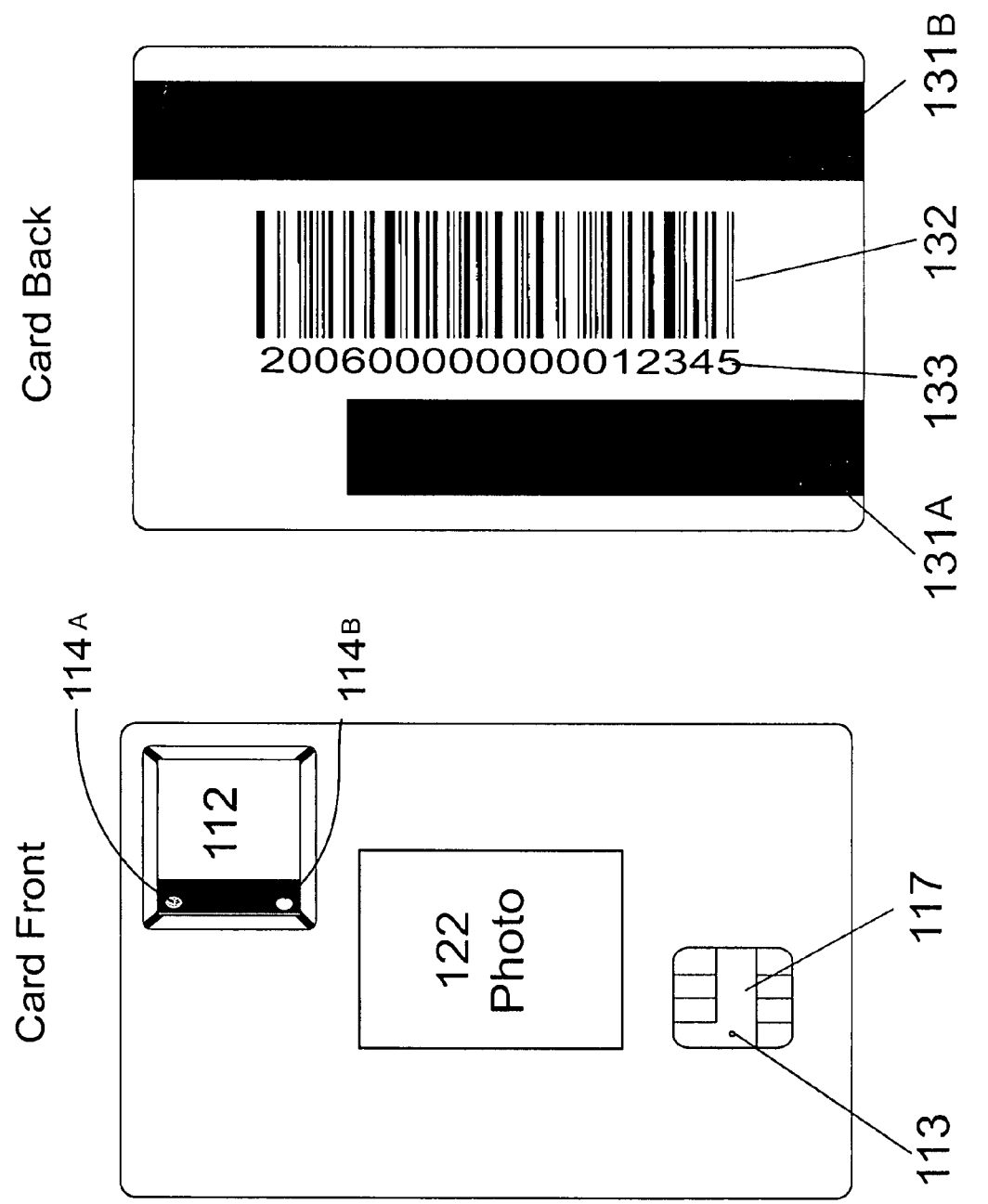
FIG. 3 is a drawing of the fingerprint scanning Safe Card scanner 2 (front and back views at A, B, respectively) according to a preferred embodiment of the present invention.

FIG. 3 illustrates the fingerprint Safe Card scanner 2 (front and back views at A, B, respectively) according to the present invention. The Safe Card scanner 2 generally comprises a small plastic credit-card sized housing exposing a holographic fingerprint scanning bed 112, wireless (infrared) transmitter 113, and two LED indicators 114 (A & B) for indicating "power on", and for indicating each fingerprint scan result "match" or "no match", respectively, plus a photo 122 for photo ID security. In addition, the Safe Card scanner 2 encloses a processor for controlling the scanning operation and transferring data via infrared, plus an amount of PROM memory for storing the activation information, and a power/communication strip 117. Preferably 64 kB of PROM memory are used for fingerprint minutia processing (approximately 30 points) accounting for about half this space. The power strip 117 is preferably a passive connector for deriving power from an external source upon contact with a mating connector in the reader. A variety of gold-plated swipe-type contacts are commercially available, or power strip 117 may be a contact-less coil.

The Safe Card scanner 2 also includes a wireless (infrared) transmitter port 113 and coder for transmitting wireless data to the computer and/or point-of-sale terminal via a supporting card reader 24. The flipside of the card 2 includes dual magnetic strips 131A & 131B (for multiple readers), one of the magnetic strips 131A being activated by fingerprint scanner 112. In addition, the Safe Card scanner 2 includes a bar code 132 and card serial number 133 There are no visible account numbers on the card.

Again, this Safe Card scanner 2 becomes the user's personal key for authenticating each and every transaction or authentication request. To consummate a transaction, the user simply inserts the Safe Card scanner 2 into any supporting capable reader, and places their finger on the fingerprint scanner 112, thereby initiating a scan of their own fingerprint. Safe Card scanner 2 is programmed to process just a subset of the scan area based on distinguishing fingerprint characteristics (minutia) lying within the apportioned scan area.

The Safe Card scanners 2 can optionally be programmed to permit an emergency response feature in the case of any unauthorized or unwanted attempt to use.

The Safe Cards 2 may also be used for personal ID authentication and secure entry. For example, the Safe Cards 2 may be used to expedite airline security at airports.

Figure 4:
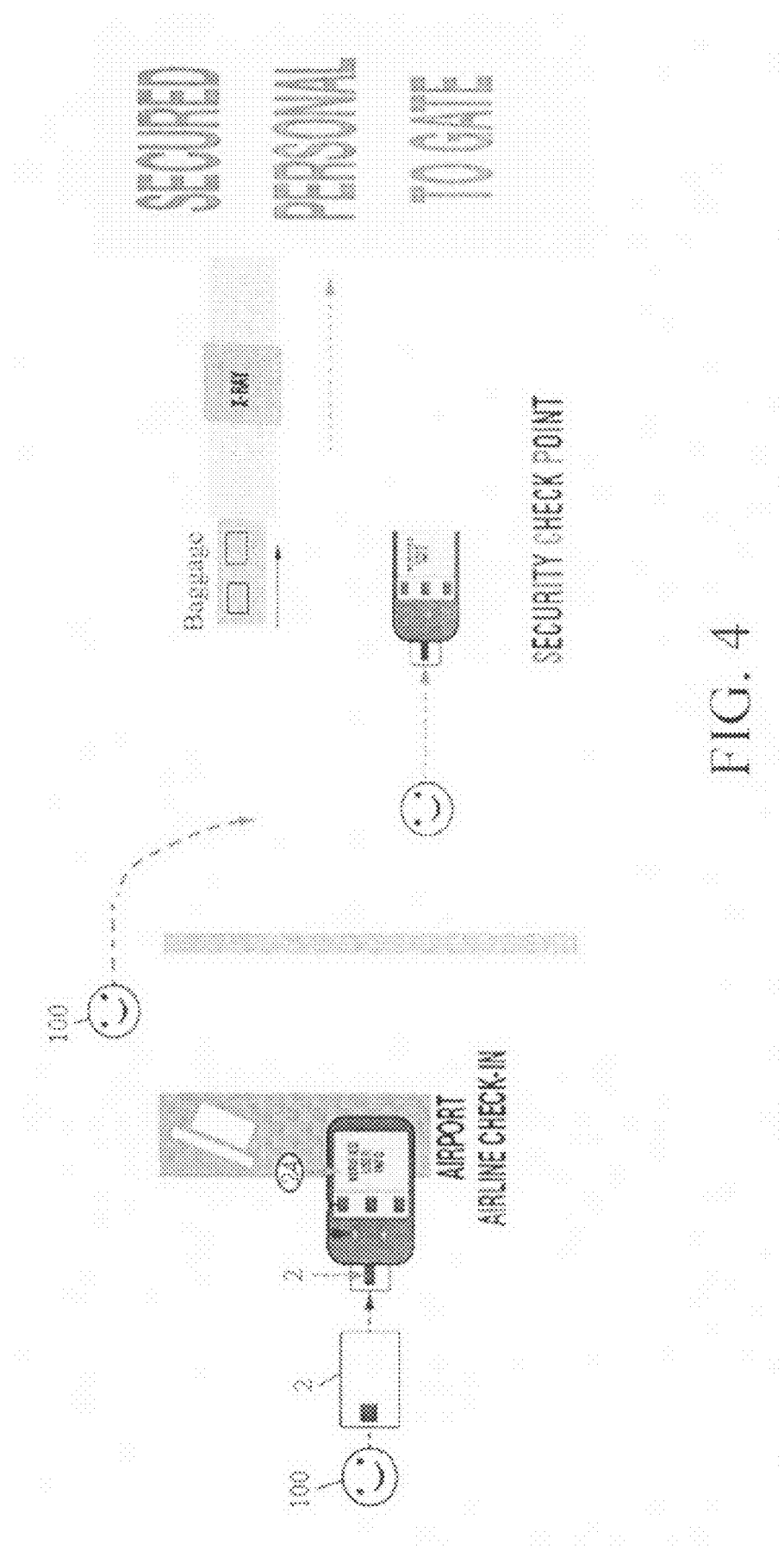

FIG. 4 illustrates the method for using the Safe Card scanner 2 for airline security check-in. As before, each Safe Card scanner 2 is the personal card of the user, and is only useable by pre-authorized and registered users. To clear security (as seen at left), a user 100 inserts Safe Card scanner 2 into a reader 24 holding their finger on the card's fingerprint scanner 12. By this the user 100 activates the Safe Card scanner 2, verifying they are authorized card user. The card reader 24 verifies the authorized user and allows them to proceed with secure check-in entirely bypassing normal security check-in procedures. The reader 24 verifies usage of card and transfers user info to the airport security gate entry system. Then, when the user 100 proceeds to the gate they need only reinsert Safe Card scanner 2 into a reader 24 at the security gate and again hold their finger on the card's fingerprint scanner 12. By this the user 100 activates the Safe Card scanner 2, verifying to security that they are authorized card user. The user's carry-on luggage is simultaneously recorded at the gate. Once approved they can bypass security. This same Safe Card concept can be applied to virtually any transportation secure check-in procedure, as well as personal access to lock-boxes, laptop computers, desktops, etc.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A method for biometric-secure transactions and authentication to eliminate fraudulent transactions and access using a plurality of card scanners, card scanner further comprising a credit card size housing, a fingerprint scanner mounted in said housing, PROM memory with no initial user fingerprint scan data stored thereon, processing means for initiating and controlling a scanning operation when a user places a finger on said fingerprint scanner to thereby obtain a real time fingerprint scan, an infrared port for transmitting data, a power contact, at least one magnetic strip, the method comprising the steps of:

issuing an unactivated card scanner to a user, said card scanner having a device ID number stored in said PROM memory;

pre-registering said user by assigning a user ID, recording said user ID and device ID in a database, and storing said user ID and said user's financial institution codes and corresponding account routing numbers in said PROM memory;

activating said card scanner by performing a first real-time fingerprint scan by receiving said users finger on said fingerprint scanner;

enrolling said user with said card scanner by storing a subset of said first real time fingerprint scan in said PROM memory;

inserting said card scanner in a card reader;

obtaining a second real-time fingerprint scan by said fingerprint scanner and initiating and controlling a scanning operation at said card reader using said fingerprint scanner;

determining a match of said first fingerprint scan and said second fingerprint scan by comparing by said processing means a subset of said second real-time fingerprint scan to the subset of said first real-time fingerprint scan;

based on said comparing step, transmitting the user ID of said user and said financial institution codes to said card reader;

selecting by use of said card reader from said financial institution codes a financial institution and account for a transaction;

transmitting from said card scanner to said card reader the corresponding account routing numbers from said PROM memory for the selected financial institution and account for said transaction; and transmitting financial details of said transaction to the designated financial institution via an exchange service provider through encrypted authentication data.

2. A method for biometric-secure online selling, buying, and bill paying in electronic commerce and retail point-of-sale setting to simplify checkout and to eliminate fraudulent transactions, using a plurality of card scanners each comprising a credit card size housing; a fingerprint scanner mounted in said housing; PROM memory means with no initial user fingerprint scan data stored thereon; processing means for controlling scanning, for authentication and verification operations, and for comparing fingerprint scan data to the fingerprint scan data stored at activation; an infrared port for communicating data to a card reader; a power contact; and at least one magnetic strip encoded with financial account information and routing numbers activated by authentication;

the method comprising the steps of, issuing an unactivated card scanner to a user, said card scanner having a device ID number stored in said PROM memory;

pre-registering said user by assigning a user ID, recording said user ID and device ID in a database, and storing said user ID and said user's financial institution codes and corresponding account routing numbers in said PROM memory;

activating said card scanner by performing a first real-time fingerprint scan by receiving said users finger on said fingerprint scanner;

enrolling said user with said card scanner by storing a subset of said first real time fingerprint scan in said PROM memory;

inserting said card scanner in a card reader;

obtaining a second real-time fingerprint scan by said fingerprint scanner and initiating and controlling a scanning operation at said card reader using said fingerprint scanner;

determining a match of said first fingerprint scan and said second fingerprint scan by comparing by said processing means a subset of said second real-time fingerprint scan to the subset of said first real-time fingerprint scan; based on said comparing step, transmitting the user ID of said user and said financial institution codes to said card reader;

selecting by use of said card reader from said financial institution codes a financial institution and account for a transaction;

transmitting from said card scanner to said card reader the corresponding account routing numbers from said PROM memory for the selected financial institution and account for said transaction; and transmitting financial details of said transaction to the designated financial institution via an exchange service provider through encrypted authentication data.

3. A method for secure payment and authentication using a card scanner comprising a credit-card sized housing, a fingerprint scanner mounted in said housing, PROM memory with no initial user fingerprint scan data stored thereon, a processor in communication with said PROM memory and said fingerprint scanner, and a device ID number prestored in said PROM memory, comprising the steps of:

issuing an unactivated card scanner to a user, said card scanner having a device ID number stored in said PROM memory;

pre-registering said user by assigning a user ID, recording said user ID and device ID in a database, and storing said user ID and said user's financial institution codes and corresponding account routing numbers in said PROM memory;

activating said card scanner by performing a first real-time fingerprint scan by receiving said users finger on said fingerprint scanner;

enrolling said user with said card scanner by storing a subset of said first real time fingerprint scan in said PROM memory;

inserting said card scanner in a card reader; obtaining a second real-time fingerprint scan by said fingerprint scanner and initiating and controlling a scanning operation at said card reader using said fingerprint scanner;

determining a match of said first fingerprint scan and said second fingerprint scan by comparing by said processing means a subset of said second real-time fingerprint scan to the subset of said first real-time fingerprint scan; based on said comparing step, transmitting the user ID of said user and said financial institution codes to said card reader;

selecting by use of said card reader from said financial institution codes a financial institution and account for a transaction;

transmitting from said card scanner to said card reader the corresponding account routing numbers from said PROM memory for the selected financial institution and account for said transaction; and transmitting financial details of said transaction to the designated financial institution via an exchange service provider through encrypted authentication data.

4. The method for secure payment and authentication according to claim 3, further comprising a step of prompting the user to place a finger on said fingerprint scanner when said user inserts said card scanner into said card reader.

5. The method for secure payment and authentication according to claim 3, wherein the step of activating said card scanner by performing a first real-time fingerprint scan and the step of determining a match of said first fingerprint scan and said second fingerprint scan occur when said user places a finger on said fingerprint scanner.

* * * * *